April 22, 1947.    G. E. WHITE    2,419,239
FIRE CONTROL SYSTEM
Filed Jan. 8, 1943    3 Sheets-Sheet 3
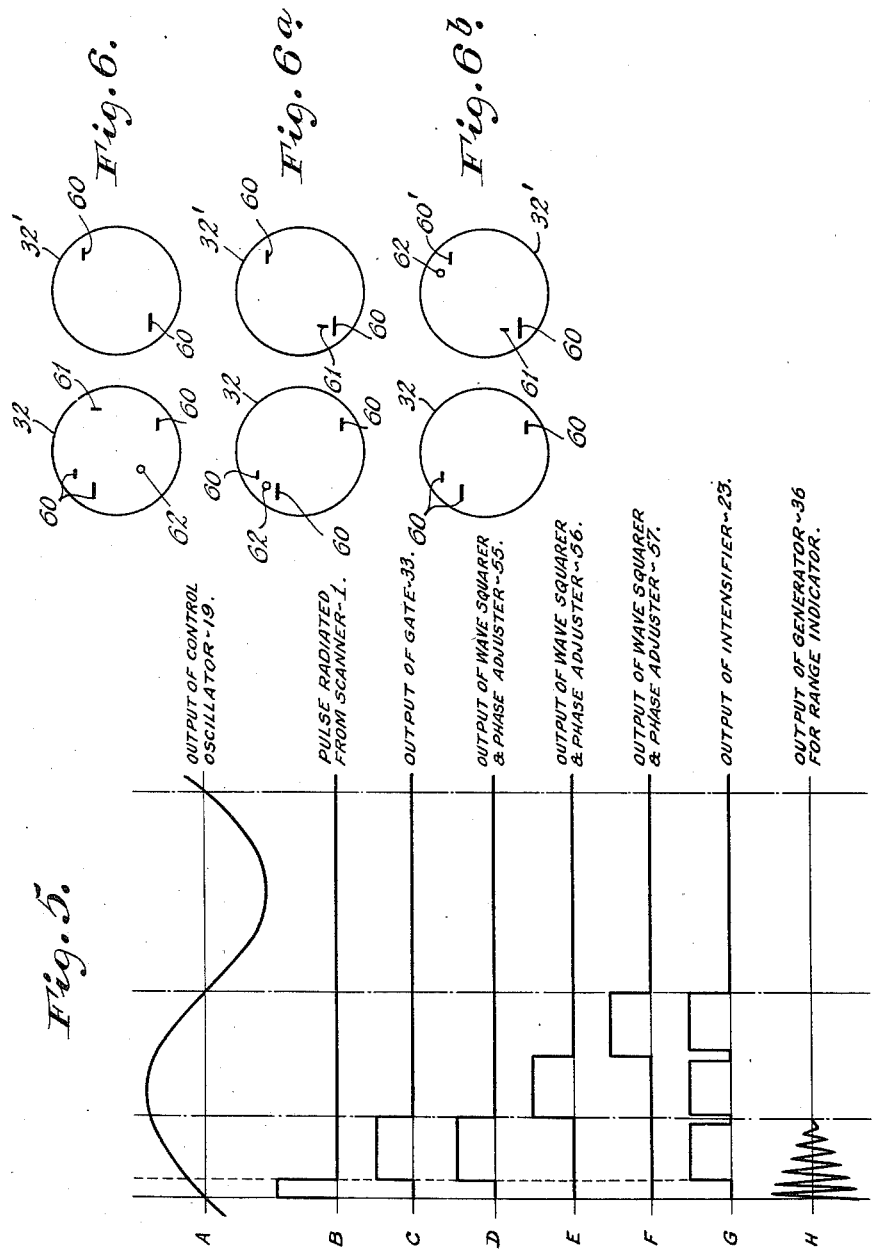
INVENTOR
G. E. WHITE
BY
ATTORNEY Patented Apr. 22, 1947

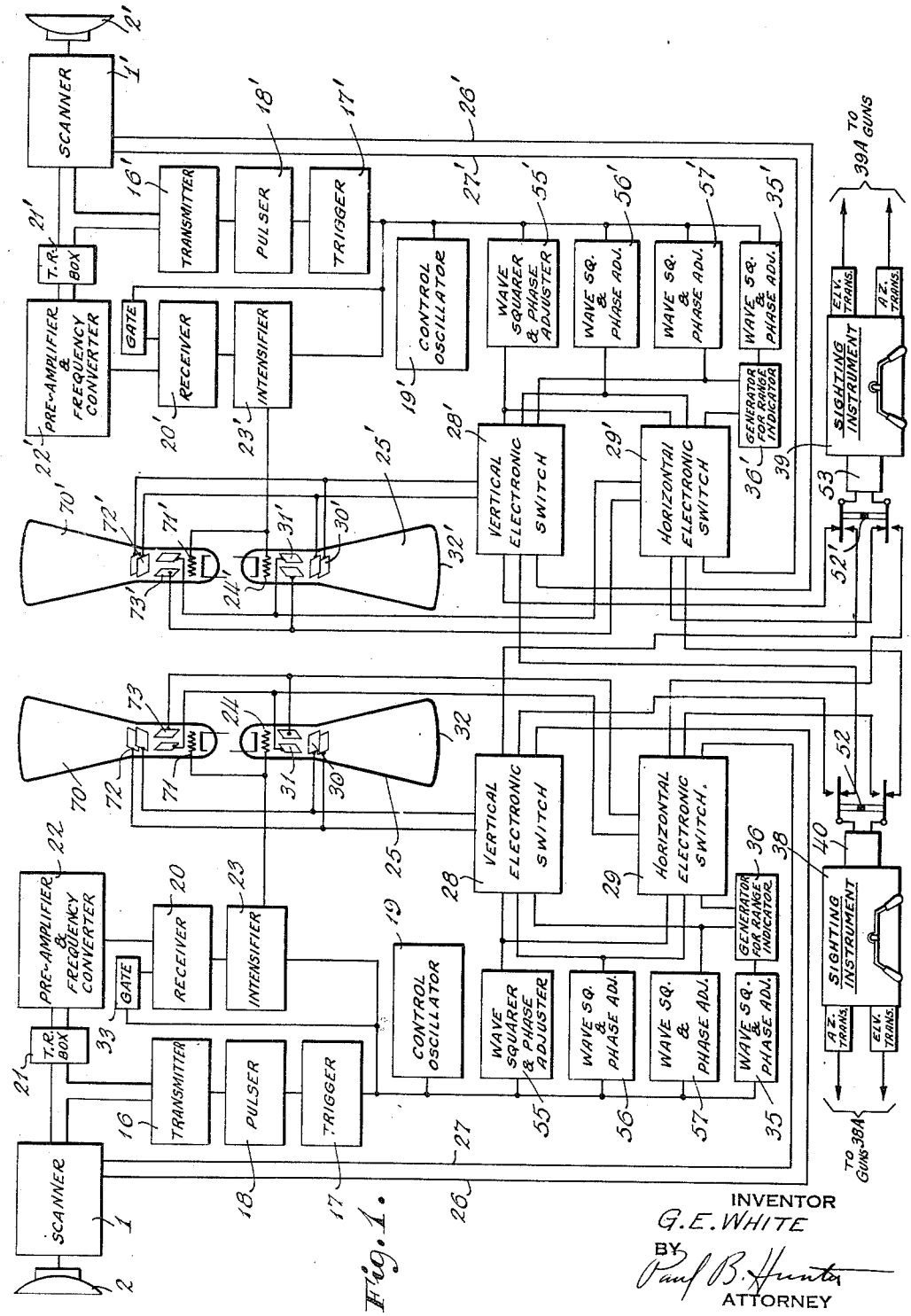

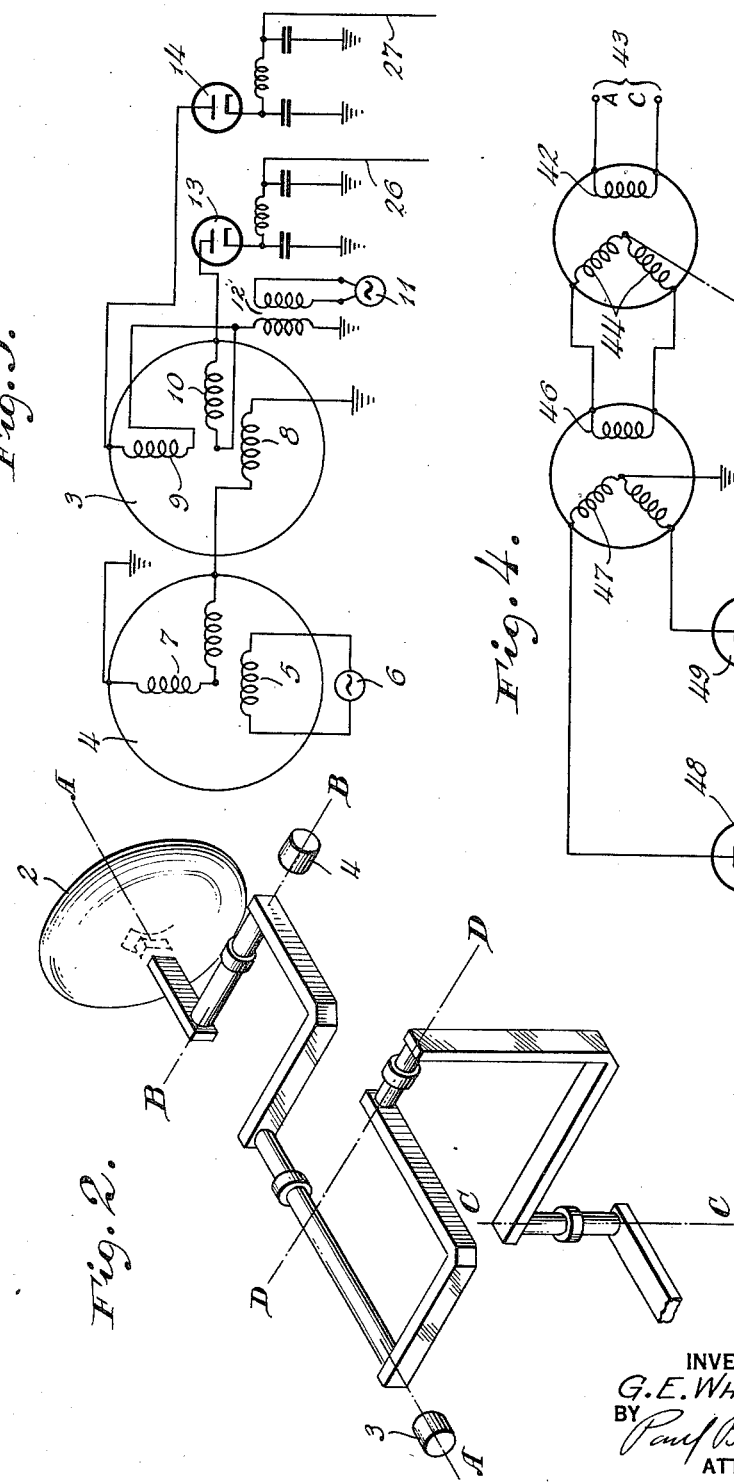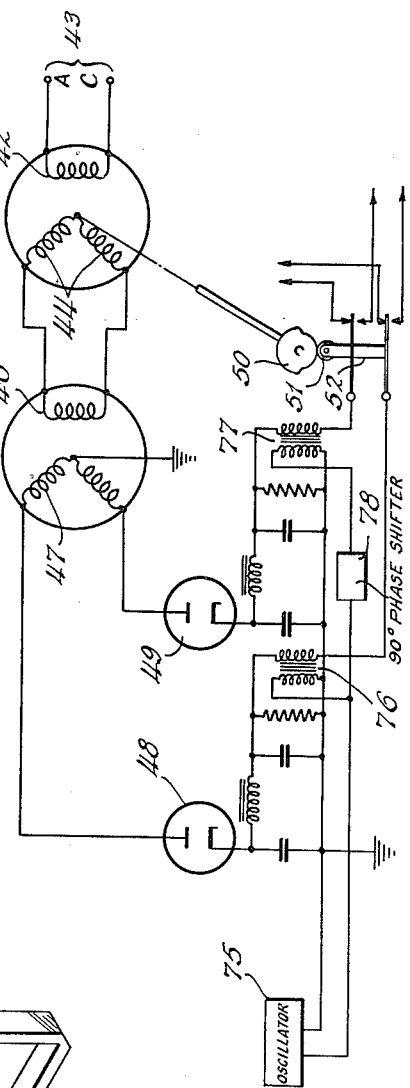

2,419,239

UNITED STATES PATENT OFFICE 2,419,239

FIRE CONTROL SYSTEM

Gifford E. White, Hempstead, N. Y., assignor to Sperry Gyroscope Company, Inc., Brooklyn, N. Y., a corporation of New York Application January 8, 1943, Serial No. 471,780

25 Claims. (Cl. 250—1)

The present invention relates to radio fire control systems especially adapted for use on aircraft and is particularly useful in a system such as that disclosed in copending application, Serial No. 441,188 for "Radio gun control system" filed April 30, 1942, in the names of C. G. Holschuh, G. E. White, W. W. Mieher, and J. E. Shepherd.

Prior systems, of the type described in the above-mentioned copending application, have provided arrangements for scanning a selected portion of space with a highly directive radiant energy beam, and apparatus responsive to the reception of reflected portions of the energy for indicating the orientation of objects in said portion of space relative to the scanning mechanism. When such systems are used on aircraft for detecting the approach of enemy craft, the mechanical limitations of the scanners has been such that the maximum portion of space which they are capable of searching is a hemisphere having its base at the scanner and its pole on a line with the "spin" axis of the scanner.

Particularly on aircraft, it is desirable to have either optical or radiant energy searching systems which are capable of scanning a portion of space equivalent to a sphere having the aircraft as its center. In such a system the position of objects within a predetermined radius of the aircraft may be detected regardless of the particular heading of the plane or the location of the objects relative thereto.

On the larger types of aircraft, operations are usually directed from a central fire control station at which it is desirable to have available, for use of the fire control officer, complete and continuous information concerning the orientation of all targets and the disposition of all guns on the aircraft.

One of the objects of the invention is to provide a system for searching the entire sphere surrounding an airship and to provide an indication of the targets located within the sphere.

Another object of the invention is to provide a central indication of the relative positions of all targets in the sphere surrounding the airship and of all sighting instruments for aiming the various guns on the airship.

A further object of the invetion is to provide a system for indicating several targets and the position of several independently operated sighting instruments for aiming the various guns relative to the targets.

A still further object of the present invention is to provide an indicator for showing the relative position in space of a plurality of targets and also for showing the changes in the aim of a plurality of guns relative to the targets.

In accomplishing these objects, a system is provided which includes the combination of two systems similar to that described in the above-mentioned application, Serial No. 441,188. Two scanners are provided to search complementary hemispheres having substantially the same base. A short pulse of highly directive high frequency energy is radiated from an antenna carried by each of the scanners, in a manner to be subsequently described, which causes a beam of energy to scan each complete hemisphere periodically. As is now well known, an object located in either of these hemispheres will reflect a portion of the radiated energy. Reception of this reflected energy is utilized to control electronic apparatus which will produce voltages corresponding to the orientation of the object in the hemisphere. These voltages may be applied to a pair of cathode ray tubes having screens representing the two hemispheres. Traces of the cathode ray beam on the screens will thus represent the position of the detected object.

Several sighting instruments, each adapted to aim one or more guns operable in both hemispheres, may be utilized in such a system. Provision is made for showing the position of each of these instruments on the cathode ray tubes corresponding to the hemisphere toward which the sighting instruments are directed at any given instant.

Other objects and advantages of the invention will become apparent from the following specification and accompanying drawings, in which, Fig. 1 shows a block diagram of a fire control system embodying the invention.

Fig. 2 shows a schematic perspective view of a scanner of the type that may be used in the present system.

Fig. 3 shows a schematic circuit diagram of sweep voltage generating apparatus actuated by the scanner.

Fig. 4 shows a schematic circuit diagram of signal voltage generating apparatus controlled in accordance with the position of a sighting instrument such as is shown in Fig. 1.

Fig. 5 shows voltage time curves of various parts of the system shown in Fig. 1.

Fig. 6 is a view of the indicators showing various positions of the targets and the sighting instrument.

Fig. 6a is a view similar to Fig. 6, but showing the sighting instrument in different positions.

Fig. 6b is also a similar view to Fig. 6, but showing the gunsights in still another position.

Fig. 1 shows a system embodying the present invention that comprises a pair of scanners 1 and 1' which may be located on any two diametrically opposed points of an airship. These scanners are positioned at the top and bottom of the fuselage in the present case. However, it is contemplated that they could be arranged on opposite sides, at either end, or at any other two opposite points without departing from the invention.

As is clearly shown in Fig. 2, the scanner 1 carries a parabolic reflector 2 for an antenna. The reflector continuously rotates or spins about the axis AA and oscillates or nods about the axis BB, as is fully described in copending application Serial No. 438,388 for "Scanning devices," filed April 10, 1942, in the names of L. A. Maybarduk et al., which matured into U. S. Patent No. 2,410,831. The axes AA and BB will hereinafter be referred to as the spin axis and the nod axis, respectively. From the combined spinning and nodding motion of the reflector, it will be seen that the beam of high frequency energy is spirally scanned over a solid angle which may be a hemisphere having its pole in line with the spin axis of the scanner.

As described in the above-mentioned copending application 441,188, spiral scanning voltages are produced by self-synchronous transmitters 3 and 4 on the scanner. These transmitters may be of any type, such as the "Selsyn," "Autosyn," or "Telegon" types. Fig. 3 shows in detail a circuit of one suitable form of apparatus for producing these voltages. A single phase winding 5 of the transmitter 4 is energized by a suitable source 6 of alternating current while the output of two-phase rotor winding 7 is connected to the single phase stator winding 8 of transmitter 3. The output of the transmitter 4 is varied in accordance with the nod position of the scanner and is applied to the single phase stator 8 of the transmitter 3. Since the two-phase rotor windings 9 and 10 of the transmitter 4 are rotated at the spin frequency of the scanner, voltages induced therein will vary in amplitude in accordance with the nod of the scanner and will be modulated by the spin frequency thereof. This voltage is similar to a suppressed carrier modulated wave, so by reinserting the carrier, as from a suitable source 11 of alternating current through transformer 12, a wave similar to the usual amplitude modulated carrier will be produced.

As will readily be seen, the envelopes of the outputs of the windings 9 and 10 are displaced by 90°. The windings 9 and 10 are connected to rectifiers 13 and 14, the outputs of which are connected through suitable filter networks to a pair of leads 26 and 27. It will be apparent that the voltages supplied to the leads 26 and 27 are displaced by 90°, are alternating at the spin frequency of the scanner and are varying in amplitude in accordance with the nod of the scanner. When these voltages are impressed on the deflecting plates of a cathode ray tube it will cause the cathode ray beam to scan the screen of the tube in a spiral fashion, thus following the spiral scanning of the reflector 2.

The scanner 1 may also be adjusted in azimuth by movement about axis C—C and in elevation by movement about axis D—D. These adjustments and the data transmission systems for indicating the azimuth and elevation position of the scanner axis are fully described in the above-mentioned copending application, Serial No. 438,388 and need not be repeated herein.

High frequency energy which is fed to the antenna of scanner 1 is generated by a transmitter 16 that is modulated by a short pulse as shown at B in Fig. 5. This pulse is produced by trigger 17 and pulser 18 in accordance with the frequency of control oscillator 19. The control oscillator 19 produces a substantially sinusoidal wave, as shown at A in Fig. 5, that is used to control and coordinate the various time elements of the system.

Energy reflected by an object in the hemisphere being searched by scanner 1 will be received by the same antenna and fed to a receiver 20 through a T-R box 21 and pre-amplifier 22. The T-R box 21 is adapted to pass relatively low intensity received pulses but block out the relatively high intensity pulses from the transmitter. One form of a T-R box suitable for this purpose is described in copending application, Serial No. 406,494, for Radio apparatus for the detection and location of objects, filed August 12, 1941, in the names of J. Lyman et al. It will be seen that the T-R box acts to isolate the receiver from the transmitter.

The pre-amplifier and frequency converter 22 feeds the received energy to the receiver 20 at an intermediate frequency. This energy is then applied through intensifier 23 to the control grid 24 of a cathode ray tube 25.

The spiral scanning voltages from rectifiers 13 and 14 are applied, through suitable connections such as 26 and 27, to vertical and horizontal electronic switches 28 and 29, respectively, and then to vertical and horizontal plates 30 and 31 of cathode ray tube 25. Assuming the cathode ray tube 25 to be normally biased to cut-off, reception of the reflected pulse will cause an indication to appear on the screen 32 of the tube. This indication will be positioned on the screen in accordance with the instantaneous values of the spiral scanning voltages applied to the deflecting plates and will, therefore, correspond to the orientation of the detected object in relation to the spin axis of the scanner 1.

The operation of the receiver 20 is controlled by a gate 33 that is actuated by the control oscillator 19 in a manner to produce a wave as shown at C in Fig. 5, which permits transmission through the receiver only during a short time interval succeeding the radiation of a pulse from the antenna.

An indication of range may be obtained in this system in a manner similar to that described in the above-mentioned application Serial No. 441,188. The output of oscillator 19 is applied to wave squarer and phase adjuster 35 which in turn excites a generator 36. The range indication generator produces a damped oscillating wave similar to that shown at H in Fig. 5 which is applied through horizontal electronic switch 29 to the horizontal plates 31 of cathode ray tube 25 during the period that the signals corresponding to the reception of reflected energy may be applied to the control grid 24. It will be seen that the damped oscillations produced by the generator 35 will vary the voltage on the deflecting plates 30 inversely in accordance with the time interval between the transmission of the transmitted pulse and the reception of the reflected pulse. This voltage acts to vary the horizontal width of the trace appearing on the screen 32 inversely in accordance with the distance of the target from the scanner 1. Thus the comparative width of the wings of the trace will indicate to the observer the relative range of the various targets appearing on the screen.

The system described to this point is substantially the same as the searching system described in copending application, Serial No. 441,188. The main difference is that the screen 32 of the cathode ray tube 25 represents the hemisphere being searched by scanner 1 and the center point of the screen represents the pole of the hemisphere, whereas in the previous application the central point of the screen represented the position of a computer.

Through the use of two systems such as that as has just been described, a pair of cathode ray tubes may be utilized to represent the entire sphere surrounding an aircraft. The second system would search a hemisphere having substantially the same base as that searched by the first system, but having its pole displaced approximately 180°.

As shown in Fig. 1, the apparatus for the second system is substantially identical with that which has already been described. The second system includes a scanner 1' carrying a parabolic reflector 2' which radiates pulses of high frequency energy fed from transmitter 16' that is controlled by trigger 17', pulser 18' and oscillator 19'. Spiral scanning voltages may be taken from scanner 1' by means of self-synchronous transmitters such as that shown in Fig. 3 and fed through suitable connectors 26' and 27' to vertical electronic switch 28' and horizontal electronic switch 29'. These voltages are applied to the vertical deflecting plates 30' and horizontal deflecting plates 31'. In this manner, the trace caused by the application of voltage to the control grid 24', corresponding to the reception of reflected energy will position a trace on the screen 32' of cathode ray tube 25' corresponding to the orientation of the target. The reflected energy is received by the receiver 20' through T-R box 21' and pre-amplifier and frequency converter 22'. An indication of range may be provided by generator 36' in a manner similar to that already described in connection with the first system.

In order for the fire control officer, who is directing operations of the various gun stations on the aircraft, to have complete information, the cathode ray tubes 32 and 32', representing the two hemispheres being searched, are also provided with indications of the position of sighting instruments 38 and 39, both of which are capable of aiming guns operable in both of the hemispheres that are searched by the respective scanners. These sighting instruments may be of any type depending upon the size of the guns and the accuracy desired. Either radio or optical sighting apparatus may be used. The sighting apparatus may be used to control the guns directly or to transmit the information to a computer of any suitable type which in turn controls the aiming of the guns. Outputs 38A and 39A of the respective sighting instruments are effective through suitable data transmission systems to control elevation and azimuth servo mechanisms for aiming one or more guns mounted at advantageous points on the ship.

The above-mentioned copending application Serial No. 441,188 discloses a radio sighting system which is adapted to either manually or automatically control the guns to track their respective targets. This system could readily be used in connection with a system embodying the present invention.

Voltages for indicating the position of the sighting instrument 38 are obtained from a transmitter 40. Any well-known self-synchronous transmitters such as the "Selsyn," "Autosyn," or "Telegon" type may be used. One suitable form of self-synchronous transmitter is shown in detail in Fig. 4 in which a single phase stator winding 42 is energized from a suitable alternating current source 43. The rotor windings 44, which are connected together to produce a single output, are rotated in accordance with the elevation of the sighting instrument. Thus current in the stator winding 42 induces a voltage in rotor windings 44, the amplitude of which is proportional to the elevation of the sighting instrument.

The voltage induced in windings 44 is applied to a second stator winding 46. The flow of current through the winding 46 causes a voltage to be induced in rotor windings 47 proportional to the elevation of the sighting instrument. However, the windings 47 are displaced by 90° and are rotated in accordance with the azimuth of sighting instrument. Therefore, the ratio of the voltages induced in windings 47 is proportional to the azimuth of the sighting instrument.

It will be readily seen that the output of the windings 47 will be a pair of voltages displaced electrically by 90° and proportional in magnitude to the elevation of the sighting instrument. The ratio of these two voltages, one to another, will be proportional to the azimuth of the sighting instrument.

The two voltages from the windings 47 are then connected through suitable rectifiers 48 and 49 and associated filter networks to produce voltages that may be applied to the deflecting plate of a cathode ray tube to produce an indication on the screen thereof corresponding to the position of the sighting instrument. This rectified voltage is applied to the deflecting plates of the cathode ray tube 25 through one of the electronic switches 28 or 29.

The elevation self-synchronous transmitter is provided with a cam 50 (Fig. 4) which moves follower 51 to control a switch 52 that is arranged to transfer the outputs of the rectifiers 48 and 49 between electronic switches 28, 29 and electronic switches 28', 29' as the sighting instrument 38 is moved through zero elevation from one hemisphere to the other. In this manner voltages representing the displacement of the sighting instrument in elevation and azimuth are switched between the horizontal electronic switches 29 and 29' and between the vertical electronic switches 28 and 28' in accordance with the elevation position of the sight 38. It will be seen that the operation of this switch acts to place the indication of the position of the sighting instrument on the cathode ray tube corresponding to the hemisphere toward which it is directed.

A similar self-synchronous transmitter 53 produces voltages corresponding to the elevation and azimuth position of sighting instrument 39. These voltages are transferred between electronic switches 28' and 29' and electronic switches 28 and 29 by cam operated switch 52' in accordance with the elevation position of the line of sight.

Electronic switches 28 and 29 are controlled by three wave squarers and phase adjustors 55, 56 and 57 which are actuated by oscillator 19 and produce voltages such as those shown in Fig. 5 at D, E and F, respectively. The electronic switches 28 and 29 may be of a type such as that shown in Schumard Patent No. 2,146,862 or that shown in copending application Serial No. 447,534, filed June 18, 1942, in the names of J. E. Shepherd et al.

The square waves developed by circuits 55, 56 and 57 act to control the switches 28 and 29 to successively apply voltages to the vertical and horizontal deflecting plates 30 and 31 of cathode ray tube 25 corresponding to the spiral scanning voltages, the position of sighting instrument 38 and the position of sighting instrument 39.

Intensifier 23 is controlled by oscillator 19 to develop a voltage such as that shown as at G in Fig. 5, which is applied to the control grid 24 during the periods that a trace should appear on the screen of the tube. Thus, return traces and extraneous noise are eliminated while the desired indications appearing on the face of the tube are brightened by the intensifier.

Similarly, wave squarers and phase adjustors 55', 56' and 57' control electronic switches 28' and 29' to apply the same succession of signals to the deflecting plates of cathode ray tube 25' as are applied to tube 25. Intensifier 23' functions in the same manner as intensifier 23.

Fig. 6 shows the screens 32 and 32' of the cathode ray tubes 25 and 25' as they appear when a plurality of targets 60 are detected and sighting instruments 38 and 39, as represented by traces 61 and 62, are both located on the screen 32. This indicates that both of the sights are directed toward the hemisphere corresponding to the screen 32. Fig. 6a shows the screens as they appear when the sighting instrument 38 has been adjusted so it is directed toward the hemisphere corresponding to screen 32'. In Fig. 6b both sights are directed toward the hemisphere represented by screen 32'.

If desired, the information presented on the screens of the cathode ray tubes 25 and 25' may be repeated at other locations or stations in the ship. This may be accomplished by providing additional pairs of cathode ray tubes such as tubes 70 and 70' which are connected in parallel with the tubes 25 and 25'. That is, control grids 71 and 71' may be connected to control grids 24 and 24', respectively; vertical deflecting plates 72 and 72' may be connected in parallel with vertical deflecting plates 30 and 30'; and horizontal deflecting plates 73 and 73' may be connected in parallel with horizontal deflecting plates 31 and 31'. With the additional tubes connected in this manner, identical indications will appear on the screens of these pairs of tubes as those that appear on the screens of the tubes 25 and 25'.

The traces of the respective sighting instruments 38 and 39 may be identified on the screens of the cathode ray tubes by providing individual characteristics, such as the vertical line 61 shown for the trace of sighting instrument 38, and the circle 62 shown for the trace of the sighting instrument 39.

One method of producing a circular trace such as that shown for the sighting instrument 39 is illustrated in Fig. 4.

As is well known, a pair of alternating voltages displaced electrically by 90° will, when applied to the plates of a cathode ray tube, cause a circular trace to appear on the face of the tube. By superimposing such alternating voltages on the outputs of the rectifiers 48 and 49, a circular trace will be positioned on the screen of the cathode ray tube. The position of the trace will depend upon the voltages from the rectifiers. The size of the circle will depend upon the proportionate values of the rectified voltages and the superimposed alternating voltages.

An oscillator 75 may be provided to generate the alternating voltage for the circular trace. The output of this oscillator may be coupled to the outputs of the rectifiers 48 and 49 by a pair of transformers 76 and 77, respectively. Obviously other suitable coupling devices could be substituted for these transformers. A phase shifting network 78 is inserted between the oscillator 75 and one of the transformers, the transformer 77 for example, to displace the volt-age applied to this transformer 90° relative to the voltage applied to the transformer 76.

It will be apparent that the trace produced on the screen of the cathode ray tube by the circuit just described will be circular in shape and will be positioned in accordance with the elevation and azimuth of the sighting instrument. A trace in the form of a vertical line, such as that shown at 61 representing the sighting instrument 38, may be produced by a similar circuit, but only coupling the oscillator to the circuit that applies voltage to the vertical deflecting plates. The circuit shown in Fig. 4 could be modified to produce a vertical line trace by disconnecting the transformer 77 from the oscillator. Obviously other identifying traces, such as cross-marks or triangles, may be provided for additional sighting instruments by varying the circuits for the respective voltages applied to the plates of the cathode ray tube.

From the foregoing description it will be apparent that each of the cathode ray indicators represents a hemispherical portion of the space having its axis in line with the spin axis of the scanner. Since the spin axis of the scanner is normally stationary with respect to the aircraft, the screen of the cathode ray tube will represent a hemisphere adjacent the aircraft. Any objects entering this hemisphere will be shown on the screen of the cathode ray tube in their proper relation to the aircraft and will move on the cathode ray screen as their position in the hemisphere changes. The traces of the various sighting instruments are also shown on the screen of the cathode ray tube in their relation to the hemispherical portion of space that is searched by the scanner. The traces of these sighting instruments also move on the screen of the cathode ray tube as they are adjusted to follow a selected target.

This system, by arranging a pair of cathode ray tubes to represent complementary hemispheres, provides means whereby one observer may ascertain the position of all targets entering the sphere surrounding the aircraft. In addition, the same devices convey to the same observer information as to the disposition of the various sighting instruments on the aircraft and their relationship to the targets. Provision is made for showing the indication of the sighting instruments on the screen of the proper cathode ray tube depending upon the hemisphere towards which the instruments are directed and for transferring the indication from the screen of one tube to the screen of another tube as the position of the instrument is transferred from one hemisphere toward the other.

It is not necessary for the scanners to scan a complete hemisphere. It is contemplated that each of the scanners may search any predetermined portion of space, in which case, the cathode ray tube would represent only the portion of space searched by the respective scanners. Also, any number of scanners, with corresponding cathode ray tubes and control circuits, may be used without departing from the invention.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A fire control system comprising an object detecting device for scanning a predetermined portion of space, a cathode ray tube having a screen representing said portion of space, means actuated by said device for causing the cathode ray beam of said tube to produce an indication on said screen corresponding to the orientation of an object in said portion of space, a sighting instrument for aiming a gun at an object located in said portion of space, and means for causing the cathode ray beam of said tube to produce an indication of the position of said instrument relative to said portion of space.

2. A fire control system comprising an object detecting device for scanning a predetermined portion of space, a cathode ray tube having a screen representing said portion of space, means actuated by said device for causing the cathode ray beam of said tube to produce an indication on said screen corresponding to the orientation of an object in said portion of space, a sighting instrument for aiming a gun at an object located in said portion of space, means for causing the cathode ray beam of said tube to produce an indication of the position of said instrument relative to said portion of space, and switching means for successively applying said two aforementioned means to the cathode ray tube.

3. A fire control system comprising an object detecting device for scanning a predetermined portion of space, a cathode ray tube having a screen representing said portion of space, means actuated by said device for causing the cathode ray beam of said tube to produce an indication on said screen corresponding to the orientation of an object in said portion of space, a device for causing the cathode ray beam of said tube to vary the indication on said screen in accordance with the range of the object, a sighting instrument for aiming a gun at an object located in said portion of space, and means for causing the cathode ray beam of said tube to produce an indication of the position of said instrument relative to said portion of space.

4. A fire control system comprising an object detecting device for scanning a predetermined portion of space, a cathode ray tube having a screen representing said portion of space, means actuated by said device for causing the cathode ray beam of said tube to produce an indication on said screen corresponding to the orientation of an object in said portion of space, a device for causing the cathode ray beam of said tube to vary the indication on said screen in accordance with the range of the object, a sighting instrument for aiming a gun at an object located in said portion of space, means for causing the cathode ray beam of said tube to produce an indication of the position of said instrument relative to said portion of space, and switching means for successively applying said two aforementioned means to the cathode ray tube.

5. A fire control system comprising an object detecting device for scanning a predetermined portion of space, a cathode ray tube having a screen representing said portion of space, means actuated by said device for causing the cathode ray beam of said tube to produce an indication on said screen corresponding to the orientation of an object in said portion of space, a plurality of sighting instruments, each of said instruments being adapted to aim a gun at an object located in said portion of space, and means for causing the cathode ray beam of said tube to produce indications on said screen representing the positions of said instruments relative to said portion of space.

6. A fire control system comprising an object detecting device for scanning a predetermined portion of space, a cathode ray tube having a screen representing said portion of space, means actuated by said device for causing the cathode ray beam of said tube to produce an indication on said screen corresponding to the orientation of an object in said portion of space, a plurality of sighting instruments, each of said instruments being adapted to aim a gun at an object located in said portion of space, means for causing the cathode ray beam of said tube to produce indications on said screen representing the positions of said instruments relative to said portion of space, and switching means for successively applying said two aforementioned means to said cathode ray tube.

7. A fire control system comprising an object detecting device for scanning a predetermined portion of space, a cathode ray tube having a screen representing said portion of space, means actuated by said device for causing the cathode ray beam of said tube to produce an indication on said screen corresponding to the orientation of an object in said portion of space, a device for causing the cathode ray beam of said tube to vary the indication on said screen in accordance with the range of the object, a plurality of sighting instruments, each of said instruments being adapted to aim a gun at an object located in said portion of space, and means for causing the cathode ray beam of said tube to produce indications on said screen representing the positions of said instruments relative to said portion of space.

8. A fire control system comprising an object detecting device for scanning a predetermined portion of space, a cathode ray tube having a screen representing said portion of space, means actuated by said device for causing the cathode ray beam of said tube to produce an indication on said screen corresponding to the orientation of an object in said portion of space, a device for causing the cathode ray beam of said tube to vary the indication on said screen in accordance with the range of the object, a plurality of sighting instruments, each of said instruments being adapted to aim a gun at an object located in said portion of space, means for causing the cathode ray beam of said tube to produce indications on said screen representing the positions of said instruments relative to said portion of space, and switching means for successively applying said two aforementioned means to the cathode ray tube.

9. A fire control system comprising a plurality of radiant energy object detecting devices arranged to scan different predetermined portions of space, a plurality of cathode ray tubes having screens corresponding to said predetermined portions of space, means actuated by said devices for causing the cathode ray beams of the respective tubes to produce indications on said screens representing the orientation of objects in said predetermined portions of space, a sighting instrument for aiming guns at targets located in more than one of said portions of space, and means for causing the cathode ray beam of the tube corresponding to the portion of space toward which said instrument is directed to produce an indication on the screen of said tube representing the position of said instrument relative to said portion of space.

10. A fire control system comprising a plurality of radiant energy object detecting devices arranged to scan different predetermined portions of space, a plurality of cathode ray tubes having screens corresponding to said predetermined portions of space, means actuated by said devices for causing the cathode ray beams of the respective tubes to produce indications on said screens representing the orientation of objects in said predetermined portions of space, a sighting instrument for aiming guns at targets located in more than one of said portions of space, means for causing the cathode ray beam of the tube corresponding to the portion of space toward which said instrument is directed to produce an indication on the screen of said tube representing the position of said instrument relative to said portion of space, and switching means for successively applying said two aforementioned means to said cathode ray tubes.

11. A fire control system comprising a plurality of radiant energy object detecting devices arranged to scan different predetermined portions of space, a plurality of cathode ray tubes having screens corresponding to said predetermined portions of space, means actuated by said devices for causing the cathode ray beams of the respective tubes to produce indications on said screens representing the orientation of objects in said predetermined portions of space, devices for causing the cathode ray beams of the respective tubes to vary the indications on said screens in accordance with the range of the objects, a sighting instrument for aiming guns at targets located in more than one of said portions of space, and means for causing the cathode ray beam of the tube corresponding to the portion of space toward which said instrument is directed to produce an indication on the screen of said tube representing the position of said instrument relative to said portion of space.

12. A fire control system comprising a plurality of radiant energy object detecting devices arranged to scan different predetermined portions of space, a plurality of cathode ray tubes having screens corresponding to said predetermined portions of space, means actuated by said devices for causing the cathode ray beams of the respective tubes to produce indications on said screens representing the orientation of objects in said predetermined portions of space, devices for causing the cathode ray beams of the respective tubes to vary the indications on said screens in accordance with the range of the objects, a sighting instrument for aiming guns at targets located in more than one of said portions of space, means for causing the cathode ray beam of the tube corresponding to the portion of space toward which said instrument is directed to produce an indication on the screen of said tube representing the position of said instrument relative to said portion of space, and switching means for successively applying said two aforementioned means to the cathode ray tubes.

13. A fire control system comprising a plurality of radiant energy object detecting devices arranged to scan different predetermined portions of space, a plurality of cathode ray tubes having screens corresponding to said predetermined portions of space, means actuated by said devices for causing the cathode ray beams of the respective tubes to produce indications on said screens representing the orientation of objects in said predetermined portions of space, a plurality of sighting instruments, each of said instruments being adapted to aim guns at targets located in more than one of said portions of space, and means for causing the cathode ray beams of the tubes corresponding to the portions of space toward which the respective instruments are directed to produce indications on the screens of said tubes representing the positions of each of said instruments relative to said portions of space.

14. A fire control system comprising a plurality of radiant energy object detecting devices arranged to scan different predetermined portions of space, a plurality of cathode ray tubes having screens corresponding to said predetermined portions of space, means actuated by said devices for causing the cathode ray beams of the respective tubes to produce indications on said screens representing the orientation of objects in said predetermined portions of space, devices for causing the cathode ray beams of the respective tubes to vary the indications on said screens in accordance with the range of the objects, a plurality of sighting instruments, each of said instruments being adapted to aim guns at targets located in more than one of said portions of space, means for causing the cathode ray beams of the tubes corresponding to the portions of space toward which the respective instruments are directed to produce indications on the screens of said tubes representing the positions of said instruments relative to said portions of space.

15. A fire control system comprising a plurality of radiant energy object detecting devices arranged to scan different predetermined portions of space, a plurality of cathode ray tubes having screens corresponding to said predetermined portions of space, means actuated by said devices for causing the cathode ray beams of the respective tubes to produce indications on said screens representing the orientation of objects in said predetermined portions of space, devices for causing the cathode ray beams of the respective tubes to vary the indications on said screens in accordance with the range of the objects, a plurality of sighting instruments, each of said instruments being adapted to aim guns at targets located in more than one of said portions of space, means for causing the cathode ray beams of the tubes corresponding to the portions of space toward which the respective instruments are directed to produce indications on the screens of said tubes representing the positions of said instruments relative to said portions of space, and switching means for successively applying said two aforementioned means to the cathode ray tubes.

16. A fire control system comprising means for producing a beam of radiant energy, means for scanning said beam over a predetermined portion of space, means for receiving that portion of said energy reflected from a distant object, a cathode ray tube having a screen representing said portion of space, means for scanning the cathode ray beam of said tube in synchronism with the scanning of said energy beam, means responsive to reception of said reflected energy for causing said cathode ray beam to produce an indication on said screen corresponding to the orientation of said object, a sighting instrument for aiming a gun at an object located in said portion of space, and means for causing the cathode ray beam of said tube to produce an indication of the position of said instrument relative to said portion of space.

17. A fire control system comprising means for producing a beam of radiant energy, means for scanning said beam over a predetermined portion of space, means for receiving that portion of said energy reflected from a distant object, a cathode ray tube having a screen representing said portion of space, means for scanning the cathode ray beam of said tube in synchronism with the scanning of said energy beam, means responsive to reception of said reflected energy for causing said cathode ray beam to produce an indication on said screen corresponding to the orientation of said object, a sighting instrument for aiming a gun at an object located in said portion of space, means for causing the cathode ray beam of said tube to produce an indication of the position of said instrument relative to said portion of space, and switching means for successively applying said two last-mentioned means to said cathode ray tube.

18. A fire control system comprising means for producing a plurality of beams of radiant energy, means for scanning said beams over separate predetermined portions of space, a plurality of cathode ray tubes, each of said tubes having a screen corresponding to one of said portions of space, means for scanning the cathode ray beams over said screens in synchronism with the corresponding energy beams, means for receiving that portion of said energy reflected from a distant object, means responsive to reception of said reflected energy for causing the beam of the cathode ray tube corresponding to the portion of space in which said object is located to produce an indication of the orientation of said object, a sighting instrument for aiming guns at targets located in more than one of said portions of space, and means for causing the cathode ray beam of the tube corresponding to the portion of space toward which said instrument is directed to produce an indication on the screen of said tube representing the position of said instrument relative to said portion of space.

19. A fire control system comprising means for producing a plurality of beams of radiant energy, means for scanning said beams over separate predetermined portions of space, a plurality of cathode ray tubes, each of said tubes having a screen corresponding to one of said portions of space, means for scanning the cathode ray beams of said screens in synchronism with the corresponding energy beams, means for receiving that portion of said energy reflected from a distant object, means responsive to reception of said reflected energy for causing the beam of the cathode ray tube corresponding to the portion of space in which said object is located to produce an indication of the orientation of said object, a sighting instrument for aiming guns at targets located in more than one of said portions of space, means for causing the cathode ray beam of the tube corresponding to the portion of space toward which said instrument is directed to produce an indication on the screen of said tube representing the position of said instrument relative to said portion of space, and switching means for successively applying said two last-mentioned means to the cathode ray tubes.

20. A fire control system as defined in claim 13, in which means is provided for causing the cathode ray beam of the tubes to produce individual indications on the screens of said tubes for identifying the respective sighting instruments represented by said indication.

21. An indicating system comprising an object detecting device for scanning a predetermined portion of space, a cathode ray tube indicator representing said portion of space, means actuated by said device for causing said tube to produce an indication corresponding to the orientation of an object in said space, an instrument having a movable directivity axis, and means connecting said instrument with said tube for causing said tube to also produce an indication of the disposition of said axis in said portion of said space whereby to indicate the position of said axis with respect to said object.

22. An indicating system comprising a plurality of object-detecting devices arranged to scan different predetermined portions of space, a plurality of cathode ray tube indicators respectively representing said predetermined portions of space, means actuated by said devices for causing said tubes to produce indications representing the orientation of objects in said predetermined portions of space, an instrument having a movable directivity axis, means adapted to cause said tubes to produce an indication of the disposition of said axis in the respective portions of space whereby to indicate the position of said axis with respect to the objects in said space portions, and means for automatically connecting said last-mentioned means with one or another of said tubes and with that tube having a space representation corresponding to the actual space toward which said axis is directed.

23. An indicating system comprising a plurality of object-detecting devices arranged to scan different predetermined portions of space, a plurality of cathode ray tube indicators respectively representing said predetermined portions of space, means actuated by said devices for causing said tubes to produce indications representing the orientation of objects in said predetermined portions of space, a plurality of instruments each having a movable directivity axis, means associated with each instrument and adapted to cause said tubes to produce an indication of the disposition of the axis of the associated instrument whereby to indicate the direction of said axes with respect to the objects in said space portions, and means for automatically connecting said last-mentioned means with one or another of said tubes and each with that one tube having a space representation corresponding to the actual zone in space toward which the axis of its associated instrument is directed.

24. An indicating system of the character recited in claim 23, in which means is provided for causing the cathode ray beam of the tubes to produce individual indications on the screens of said tubes for identifying the respective sighting instruments represented by said indications.

25. A fire control system of the character recited in claim 5, in which means is provided for causing the cathode ray beam of the tube to produce individual indications on the screen of said tube for identifying the respective sighting instruments represented by said indications.

GIFFORD E. WHITE.

REFERENCES CITED

The following references are of record in the file of this patent:

UNITED STATES PATENTS

| Number | Name | Date |
|---|---|---|
| 1,817,907 | Bassett et al. | Aug. 11, 1931 |
| 2,231,929 | Lyman | Feb. 18, 1941 |